Nov. 12, 1963
W. H. MEANS
3,110,349
CULTIVATING AND WEEDING TOOL
Filed Jan. 26, 1962
2 Sheets-Sheet 1
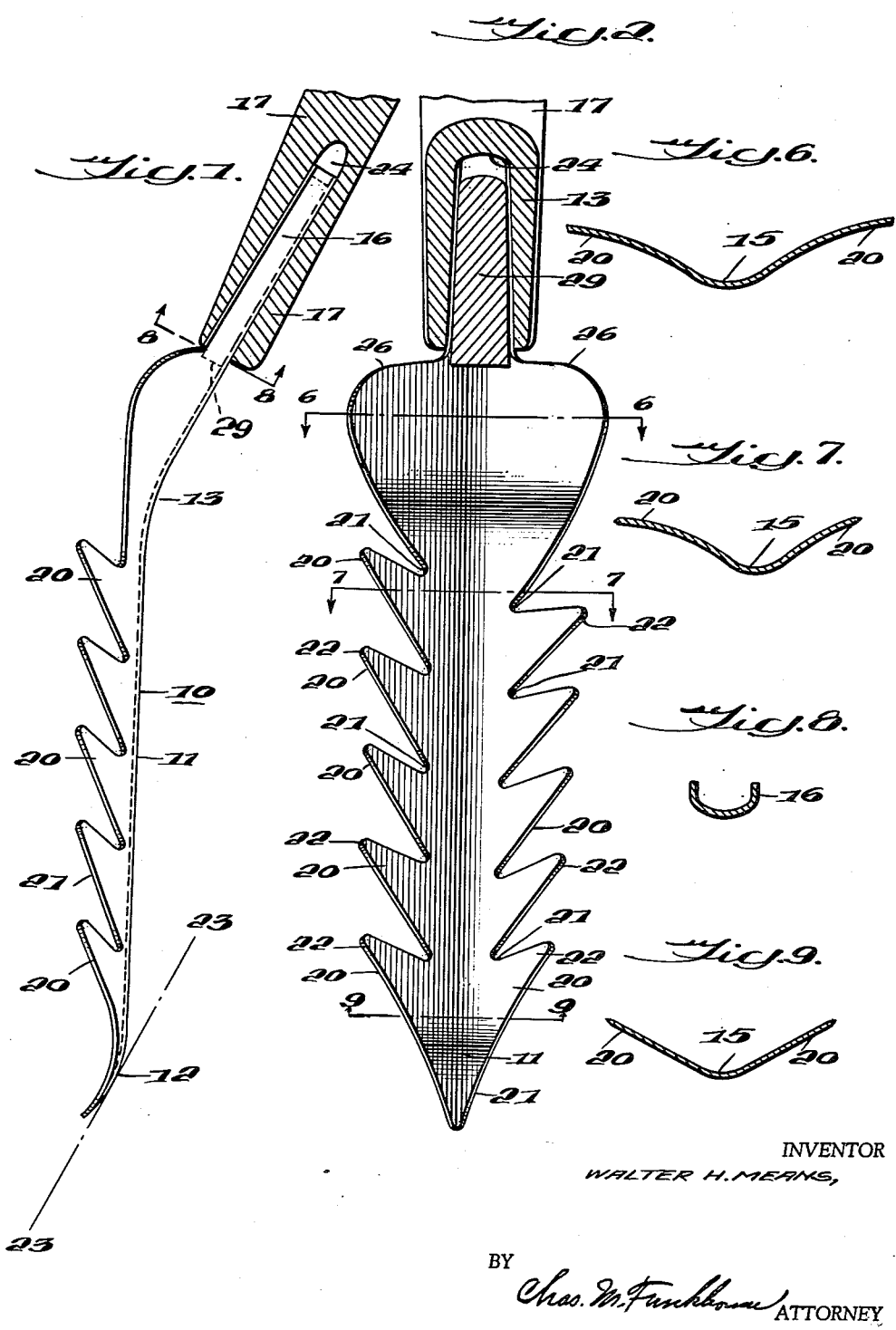
INVENTOR
WALTER H. MEANS,
BY Chas. M. Funkhouser ATTORNEY

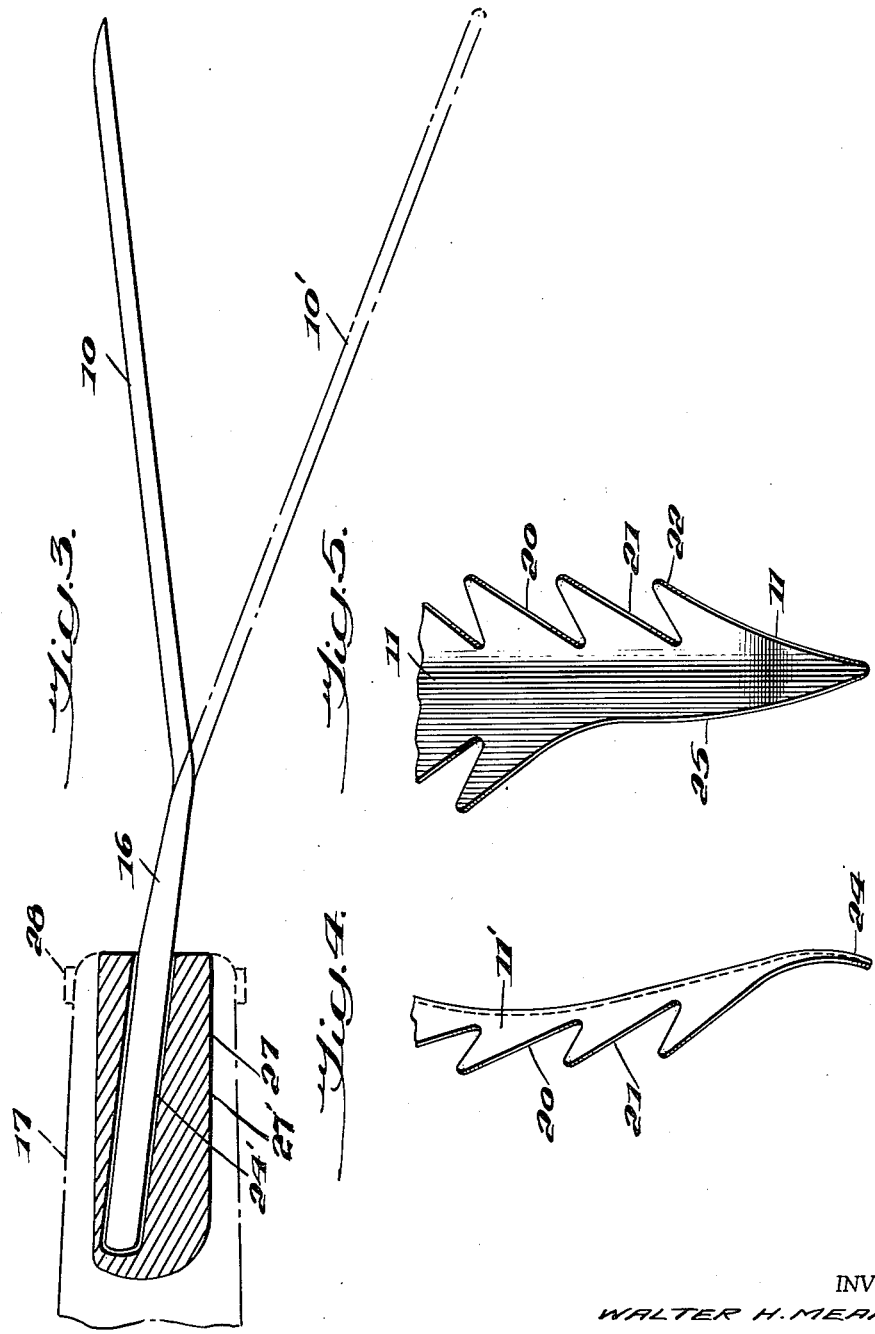

United States Patent Office 3,110,349
Patented Nov. 12, 1963

3,110,349
CULTIVATING AND WEEDING TOOL
Walter Hillyer Means, Atlanta, Ga., assignor to
Walter H. Means and Associates
Filed Jan. 26, 1962, Ser. No. 168,923
6 Claims. (Cl. 172—379)

This invention relates to improvements in garden tools of the type usually referred to as a weeder or soil cultivator and more particularly to a utility tool for cutting, pulling and raking grass, weeds and vines and the like as well as working the soil.

I am aware of the numerous types and forms of individual tools for a similar purpose but none of these are designed for a general utility tool combining all the features in a single tool. For example, many spade like tools have toothed edges for cutting roots of grass, weeds and the like without the advantage of specific cultivation of soil in a desired advantageous manner. In other words the tool embodying my invention is of such novel construction and nature so as to perform the combined functions of the several individual garden tools now in use for such purposes.

One important object of the present invention is to provide a utility tool of the character designed which shall have a novel blade structure designed to operate more efficiently in a greater variety of soil working and weeding conditions than similar implements heretofore produced for a like purpose.

Another object of the invention is to provide a soil working implement of the character designed having a novel form of cutting and toothed blade portions including curved and angularly disposed sections which shall provide different soil engaging edges for different purposes during the manipulation of the tool.

A further object of the invention is to provide a garden tool in which the blade portion includes throughout its longitudinal dimension curved body portions and outwardly flared and curved serrated toothed edge portions constructed and arranged to provide hook shaped cutting edges as well as soil working portions.

A further object of the invention is to provide a novel soil working implement of the character designated in which the teeth on one side are progressively offset transversely from the teeth on the opposite side of the body portion of the tool.

A further object of the invention is to provide a novel form of soil working implement in which the side edge cutting teeth of the body portion of the tool shall progressively vary longitudinally in area from the soil engaging point to the handle portion of the tool.

A further object of the invention is to provide a tool of the character designated in which the soil working portions of the tool shall be adjusted angularly with relation to the tool handle to change the soil working ability of the tool.

A further object of the invention is to provide a novel form of garden tool in which a longitudinally disposed blade portion shall include a curved soil engaging section at the point, mid section and a curved top section adjacent the handle portion of the tool blade which shall be substantially in parallel alignment with the point section.

A further object of the invention is to provide a novel garden tool which shall be more durable in construction, efficient in operation and produced from a single sheet metal die stamping at a minimum of expense.

These and other objects of the invention will be more manifest from the following specification and drawings and more particularly set forth in the claims.

In the drawings:

FIGURE 1 is an elevational side view of the weeding tool;

FIGURE 2 is a front view in elevation of the tool looking at FIGURE 1 from the left of said figure;

FIGURE 3 is a diagrammatic view showing the effects of the eccentric mounting of the blade in the handle;

FIGURE 4 shows a modification of the lower ground engaging portion of the tool shown in FIGURES 1 and 2;

FIGURE 5 is a partial front view of the modification shown in FIGURE 4;

FIGURE 6 is a sectional view of the blade on line 6—6 of FIG. 2;

FIGURE 7 is a sectional view on line 7—7 of FIG. 2;

FIGURE 8 is a sectional view on line 8—8 of FIG. 1; and

FIGURE 9 is a sectional view on line 9—9 of FIG. 2.

Referring to the drawings, FIGS. 1, 2 and 3, there is shown a weeding and soil working tool 10 embodying the several novel features of the invention. This tool includes substantially a longitudinally disposed spade-like body portion having a formed metal central body blade portion 11 preferably formed of sheet steel, a lower curved terminal or spear shaped pointed ground engaging portion 12 and a curved upper section 13 for receiving a handle 13. All of these portions are designed to form a smooth working tool blade. The soil working portions or sections of the blade are also curved or flared transversely from the channel portion as shown in FIGS. 6, 7 and 9 so as to provide effective cutting and soil working toothed edges. The tool blade body is preferably formed of tempered tool steel and also includes a shallow longitudinal channel portion 15 which extends throughout the length of the tool and provides the desired back bone strength for the tool from the tip to the handle portion thereof. The upper end of the channel 15 tapers into a straight portion which is U shaped as shown in FIG. 8 by the numeral 16. This portion of the tool receives a handle member 17 which is constructed and arranged to adjust the blade angularly as more fully hereinafter described. The handle 17 may be a short hand handle for close work or a long handle so that the workman may stand upright and use the tool as a spade for certain kinds of work.

The longitudinal lateral side edge of the blade body portions each includes a series of upwardly inclined laterally curved sharpened teeth of substantial depth and flared outwardly as indicated by the numerals 20—20 as shown in FIGS. 6, 7 and 9. These teeth have sharpened edges from the valley or gullet portions and extend toward the front of the tool as shown in FIGURE 2. It will be noted that the valley or gullet portions 21—21 of the pairs of teeth 20—20 at the terminal ground engaging portion 11 are substantially opposite or at the same elevation while those at the upper end of the blade 10 are at a different elevation. In other words the teeth on one edge of the blade vary progressively from top to bottom of the tool from those on the offside and thus provide the desired root cutting and soil working areas. All edges of each tooth are sufficiently sharp to provide cutting edges from the tip to the valley portions as indicated by the numerals 21—21. The extreme outer ends of the teeth are also sharpened to cutting edges as indicated by the numerals 22—22 so as to provide for cutting grass and weed roots upon penetration, twisting and withdrawal of the tool from the ground.

Another important feature of the tool is the pointed soil engaging portion 12. This portion is curved and the tangent thereof indicated by the numeral 23 is in a plane substantially parallel to the straight handle portion 16. This arrangement enhances the soil working ability of the tool by enabling it to penetrate the soil with a twisting motion of the handle 17, and at the same time applying a straight line force, a diagonally formed cylindrical channel 24 in the handle 17 facilitates this operation.

The planar relation of the handle 17 to the curved pointed portion 12 of the tool enables it to be used most conveniently in making a furrow by straight line motion to plant seeds and then with a twisting motion the tool teeth may be drawn along the side of the furrow to cover the seeds lightly or deeply as the occasion may require, a diagonally formed channel 24 facilitates this operation. If the particular job requires a prying force to dislodge a plant or effect a digging operation, the tool may be reversed to penetrate the soil in a desired effective manner.

Another way of effectively reversing the tool is shown in FIG. 3 wherein the metal tool shank 16 is diagonally mounted in the handle 17 by means of a separate cylindrical plug bushing indicated by the numeral 27 adapted to fit into an appropriate cylindrical opening 27' in the end of the tool handle 17. In this case, the tool end 16 may be rotated within the bushing to provide a choice of working angles and then clamped in position by any suitable securing means such as a ring ferrule indicated by the numeral 28.

In the particular illustration, the blade 10 shown diagrammatically in dotted line 10' is rotated 180°. The blade 10 may be retained in the handle at any diagonal angle convenient to the person operating the tool for any particular soil working or weeding job to be accomplished.

For example, the tool is particularly adapted for cutting and raking weeds and grass, to remove the same from the soil, which may be by pulling the weeds from the soil if they are too large to be cut, and the provision of the adjustable handle relative to the operating parts of the tool greatly enhances its value as a soil cultivator or penetrates the ground for any purpose.

The soil working pointed portion 11 of the tool may be modified as shown in FIGS. 4 and 5. In this construction it will be noted that one side of the point 11 may consist of a longer cutting edge as indicated by the numeral 25. The advantage of this particular modification is that the opposite teeth shall serve as a pry or support when twisting the tool for performing a particular service in working soil. This is especially beneficial in working rocky or hard soil where it is difficult to attain sufficient soil penetration. Furthermore, the mid longitudinal mid portion is curved slightly as indicated by the numeral 11' but the same cutting ability of the teeth is maintained in the same relative position.

Whichever form of tool is employed, the upper end of the blade is provided with an outstanding shoulder portion 26 which not only strengthens the tool but provides a foot rest for forcing the tool into the ground. For use with a short handle, the tool blade end 16 may be frictionally forced into the opening 24 in the handle 17 but for long handle work, the U-shaped end may be retained in the handle channel 24 by a suitable wedge indicated by the numeral 29. Whichever form of fastening device is used to secure the end 16 into the handle it is contemplated to provide the desired clamping ferrule to adequately secure the tool rigidly to the handle.

While I have shown and described a garden tool constructed and arranged in accordance with the present invention, it is obvious that various changes may be made therein without departing from the scope thereof as defined in the following claims.

What I claim is:

1. A formed metal soil working and cutting tool comprising a longitudinally channeled body portion flared transversely throughout its length, a substantially pointed terminal ground penetrating portion curved from the bottom channel line of said body portion, an upper body portion curved rearwardly from the channel line and terminating as a substantially U-shaped and elongated handle engaging portion, the channel bottom line of said elongated portion and the tangent at the midpoint of the curve of said ground engaging portion lying in substantially parallel planes, soil working and cutting teeth formed on the opposite side edges of said flared body portion, said teeth being slanted upwardly toward the handle, the teeth on one side being progressively offset transversely from the teeth on the opposite side edge of the body member to vary the soil working ability of the tool from the point to the handle engaging portion, and strengthen the tool.

2. A garden tool of the character described in claim 1 in which the side edge cutting teeth of the body portion are sharpened at the upper and lower edges and formed of progressively larger area toward the handle end of the tool, and the ground engaging point is spear-arrow shaped.

3. A soil working and cutting tool of the character designated in claim 1 in which the gullet portions of the teeth on opposite sides of the blade are in horizontally different transverse planes whereby added strength is imparted to the tool and the ground engaging surfaces are different at each movement of the tool.

4. A soil working and cutting tool of the character described in claim 1 wherein the tool blade is eccentrically mounted in a handle for varying the angle of the soil penetrating blade point relative to the direction of applied force on the handle.

5. A soil working and weed cutting tool of the character described in claim 1 including a cylindrical bushing having a diagonally disposed channel formed therein for receiving a tool blade and means for adjustably securing the bushing in a handle for manipulating the blade to perform useful work.

6. A soil working and cutting tool of the character described in claim 1 in which the pointed soil penetrating portion includes at one side thereof a relatively long cutting edge.

References Cited in the file of this patent
UNITED STATES PATENTS

| | | |
|---|---|---|
| 96,740 | Springstead | Nov. 9, 1869 |
| 698,715 | Knight | Apr. 29, 1902 |
| 1,262,482 | Hales | Apr. 9, 1918 |
| 1,710,039 | Bauer | Apr. 23, 1929 |
| 2,635,363 | Seymour | Apr. 21, 1953 |

FOREIGN PATENTS

| | | |
|---|---|---|
| 18,468 | Great Britain | Aug. 4, 1910 |

OTHER REFERENCES

Germany, app'n No. 10,633 printed Oct. 6, 1955.